United States Patent
Huang

(10) Patent No.: US 6,478,275 B1
(45) Date of Patent: Nov. 12, 2002

(54) SUPPORT DEVICE FOR MONITOR, DISPLAYER OR OTHER OBJECT

(76) Inventor: Min Hwa Huang, No. 30, Hsin Jon Street, Chong Chuang Tsuen, Da Liao Hsiang, Kaoshiung (TW), 831

( * ) Notice: Subject to any disclaimer, the term of this patent is extended or adjusted under 35 U.S.C. 154(b) by 0 days.

(21) Appl. No.: 09/943,296

(22) Filed: Aug. 31, 2001

(51) Int. Cl.$^7$ .................................................. E04G 3/00
(52) U.S. Cl. ........................... 248/284.1; 248/278.1; 248/917
(58) Field of Search ................... 248/274.1, 276.1, 248/278.1, 279.1, 283.1, 284.1, 286.1, 231.71, 917, 919, 922

(56) References Cited

U.S. PATENT DOCUMENTS

| | | | | |
|---|---|---|---|---|
| 4,695,024 A | * | 9/1987 | Haven ..................... | 248/281.11 |
| 5,553,820 A | * | 9/1996 | Karten et al. ............ | 248/286.1 |
| 5,713,549 A | | 2/1998 | Shieh ....................... | 248/284.1 |
| 5,799,917 A | * | 9/1998 | Li ............................. | 248/284.1 |
| 5,842,672 A | * | 12/1998 | Sweere et al. ........... | 248/278.1 |
| 5,975,472 A | * | 11/1999 | Hung ....................... | 248/278.1 |
| 6,012,693 A | * | 1/2000 | Voeller et al. ......... | 248/280.11 |
| 6,027,090 A | * | 2/2000 | Liu .......................... | 248/281.11 |
| 6,116,557 A | * | 9/2000 | Choy et al. ................ | 248/86.1 |
| 6,199,809 B1 | | 3/2001 | Hung ....................... | 248/284.1 |
| 6,315,259 B1 | * | 11/2001 | Kolb ........................ | 248/276.1 |
| 6,394,403 B1 | * | 5/2002 | Hung ....................... | 248/276.1 |
| 6,398,176 B1 | * | 6/2002 | Liu ........................... | 248/284.1 |

* cited by examiner

*Primary Examiner*—Anita King
(74) *Attorney, Agent, or Firm*—Charles E. Baxley

(57) ABSTRACT

A support device includes a base, a bracket for supporting an object, and an arm and a lever pivotally secured between the base and the bracket for forming a parallelogrammic structure. The arm is pivotally secured to the base with a shaft. The lever is secured to the base with a rod and has a curved groove for slidably receiving the shaft. The lever has an orifice for loosely receiving the rod. The base has a stop for engaging and latching the lever to the base, without additional fasteners, when the lever is elevated relative to the base.

10 Claims, 10 Drawing Sheets

SUPPORT DEVICE FOR MONITOR, DISPLAYER OR OTHER OBJECT

BACKGROUND OF THE INVENTION

1. Field of the Invention

The present invention relates to a support device, and more particularly to a support device for supporting the monitors, the displayers, the screens, or the other objects.

2. Description of the Prior Art

FIGS. 1 and 2 illustrate two of the typical support devices for supporting the monitors, the displayers, the screens, or the other objects, and include a parallelogrammic structure for rotatably supporting the objects, and for adjusting the objects upward and downward to the selected position. A spring member 70 (FIG. 1) or an actuator 80 (FIG. 2), such as a hydraulic cylinder or a pneumatic cylinder, is provided and disposed in the parallelogrammic structure for rotatably supporting and adjusting the objects to any suitable or selected height or position. After adjusting the parallelogrammic structure and the objects to the suitable or selected height or position, an adjusting device or a fastener 90 is required to secure the parallelogrammic structure and thus the object at the selected position. Accordingly, when it is required to secure or to attach or to adjust the objects to the other suitable positions, it may take a long time to unthread and to thread or fasten the fasteners.

U.S. Pat. No. 5,713,549 to Shieh. and U.S. Pat. No. 6,199,809 to Hung disclose two of the similar typical support devices for supporting the monitors, the displayers, the screens, or the other objects, and also include a parallelogrammic structure for rotatably supporting the objects, and for adjusting the objects upward and downward to the selected position. These typical support devices also include a spring member or a fastener or an adjusting member provided in or coupled to the parallelogrammic structure for rotatably supporting and adjusting the objects to any suitable or selected height or position, and for adjusting and securing the parallelogrammic structure and thus the object at the selected position. It may also take a long time to unthread and to thread or fasten the fasteners and to secure or to adjust the objects to the other suitable positions, The present invention has arisen to mitigate and/or obviate the afore-described disadvantages of the conventional support devices for objects.

SUMMARY OF THE INVENTION

The primary objective of the present invention is to provide a support device for supporting the monitors, the displayers, the screens, or the other objects, and for easily and quickly adjusting the objects to the selected position without unthreading and threading fasteners.

In accordance with one aspect of the invention, there is provided a support device comprising a base, a bracket for supporting an object, an arm including a lower portion pivotally secured to the base with a shaft, and including an upper portion pivotally secured to the bracket with an axle, and including a curved channel formed therein and formed around the axle, a lever including a lower portion pivotally secured to the base with a rod, and including a curved groove formed in the lower portion thereof and formed around the rod for slidably receiving the shaft and for allowing the lever to be rotated relative to the base, the lever including an upper portion pivotally secured to the bracket with a post, the post being slidably received in the curved channel of the arm for allowing the upper portion of the lever and the post to be rotated relative to the arm about the axle, and means for selectively latching the lower end of the lever to the base after the arm and the lever are rotated and adjusted relative to the base. The lever and the arm may be easily and quickly secured to the base without additional fasteners after the arm and the lever have been rotated and adjusted relative to the base to the required or selected angular position.

The selectively latching means includes an orifice formed in the lower portion of the lever for receiving the rod, the orifice of the lever includes an inner diameter greater than an outer diameter of the rod for loosely receiving the rod therein, and for allowing the rod to be moved relative to the base by sliding the rod upward and downward relative to the orifice of the lever.

The selectively latching means includes a stop secured to the base for engaging with the lower portion of the lever and for locking the lever to the base when the rod moves upward relative to the orifice of the lever, the lower portion of the lever is allowed to be disengaged from the stop when the lever is elevated relative to the base and to move the rod downward relative to the orifice of the lever.

The lever includes a peripheral flange formed and provided in the lower portion thereof and provided around the rod for engaging with the stop.

A spring biasing device may further be provided for biasing the arm to elevate the bracket to the upper position. A device may further be provided for limiting a rotational movement of the arm relative to the base, and includes a curved passage formed in the lower portion of the arm for slidably receiving the stop.

The arm includes a downwardly curved flap provided on the lower portion thereof for forming and defining the curved passage thereof.

A coupler is further provide d and pivotally secured to the bracket with a first pin, and a frame pivotally secured to the coupler with a second pin, the first pin is offset and perpendicular to the second pin, for allowing the frame and the object to be rotated and adjusted relative to the bracket.

A clamp is further provided and rotatably secured to the base with a pivot spindle, for allowing the base to be rotated relative to the clamp about the pivot spindle.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
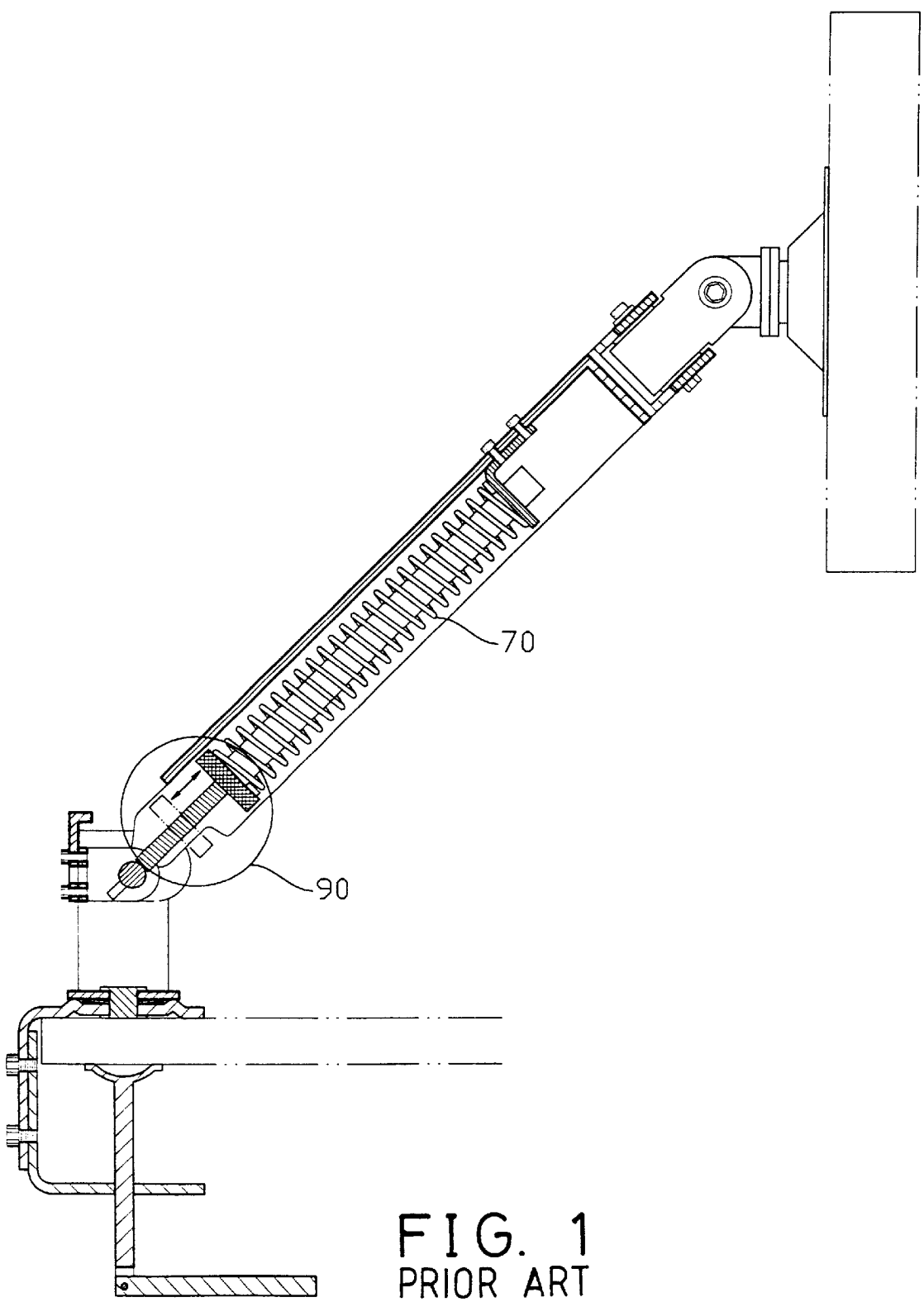
FIG. 1 is a cross sectional view illustrating one of the typical support devices having a spring member for supporting the monitors, the displayers, the screens, or the other objects at the suitable or at the selected position.
Figure 2:
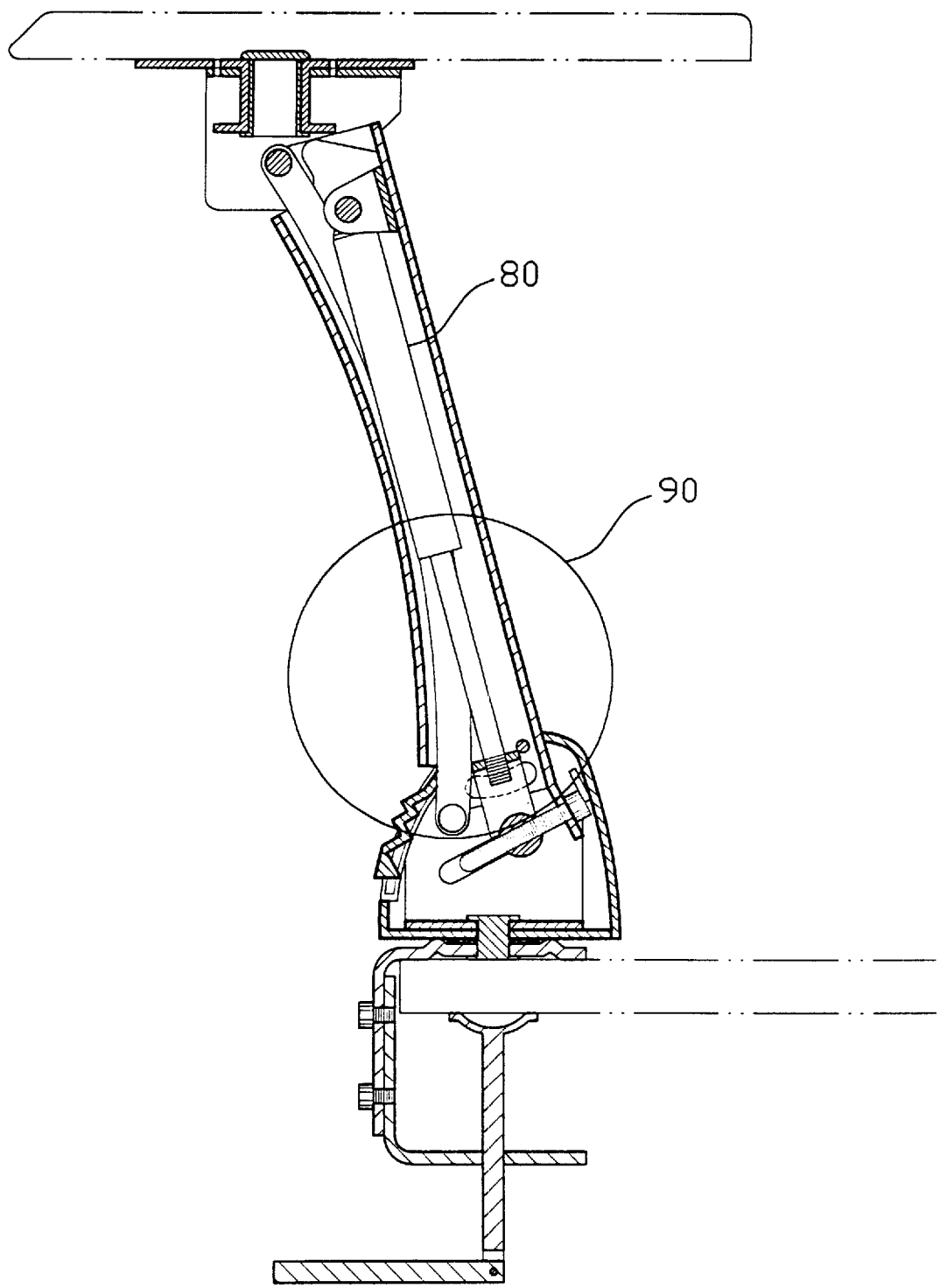
FIG. 2 is a cross sectional view illustrating the other typical support devices having a hydraulic or pneumatic actuator for supporting the monitors, the displayers, the screens, or the other objects at the suitable ore selected position.
Figure 3:
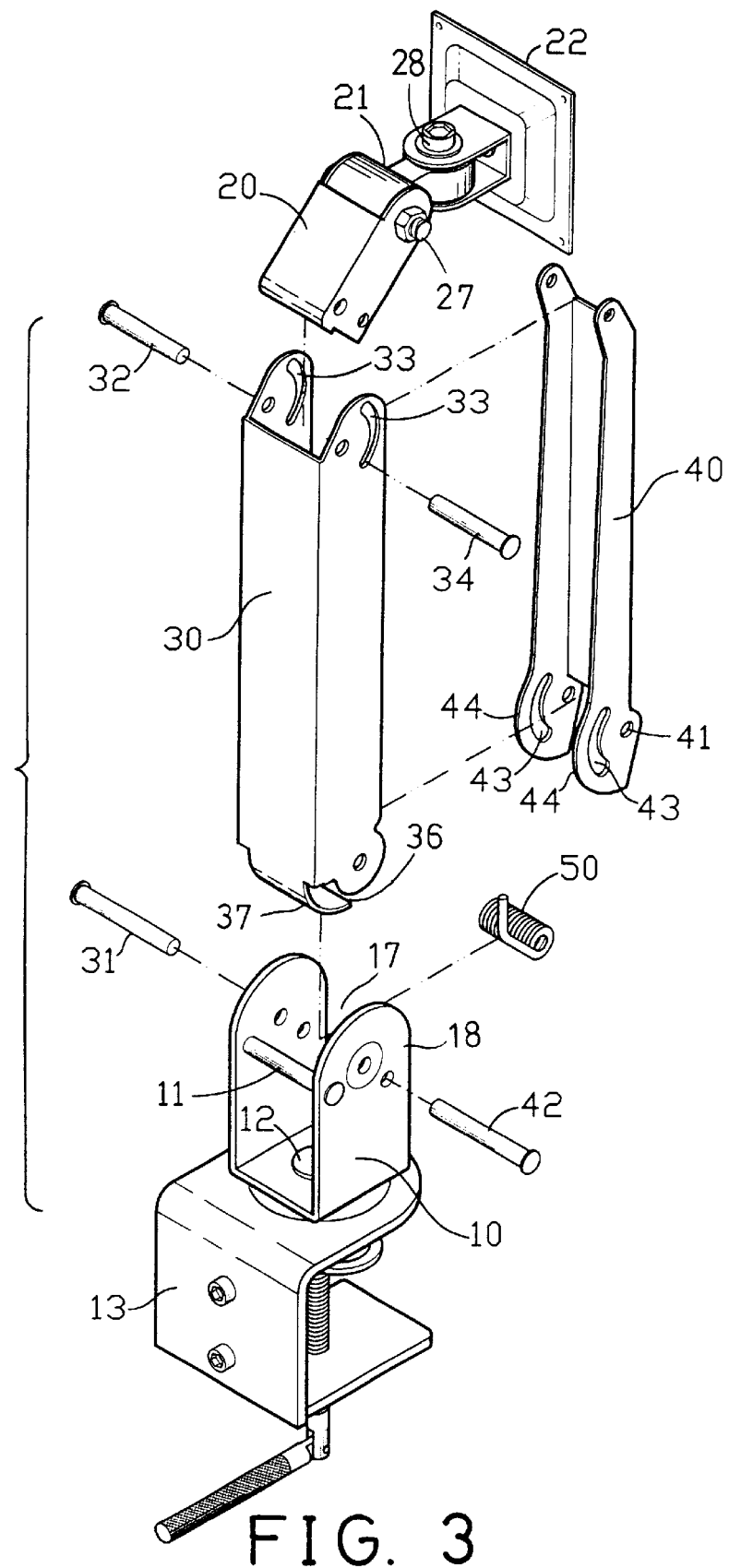
FIG. 3 is an exploded view of a support device in accordance with the present invention.
Figure 4:
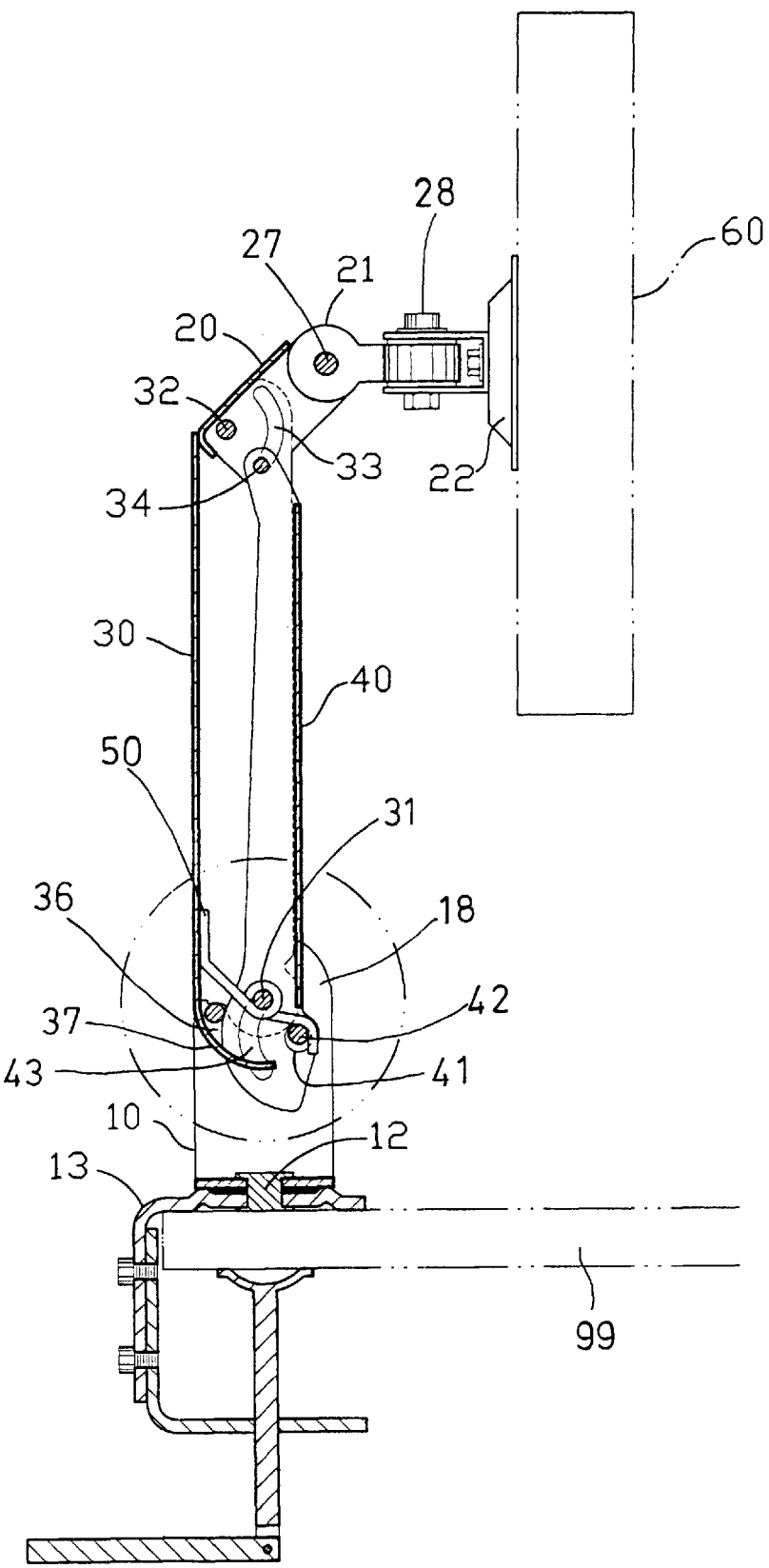
FIG. 4 is a cross sectional view of the support device in accordance with the present invention.
Figure 5:
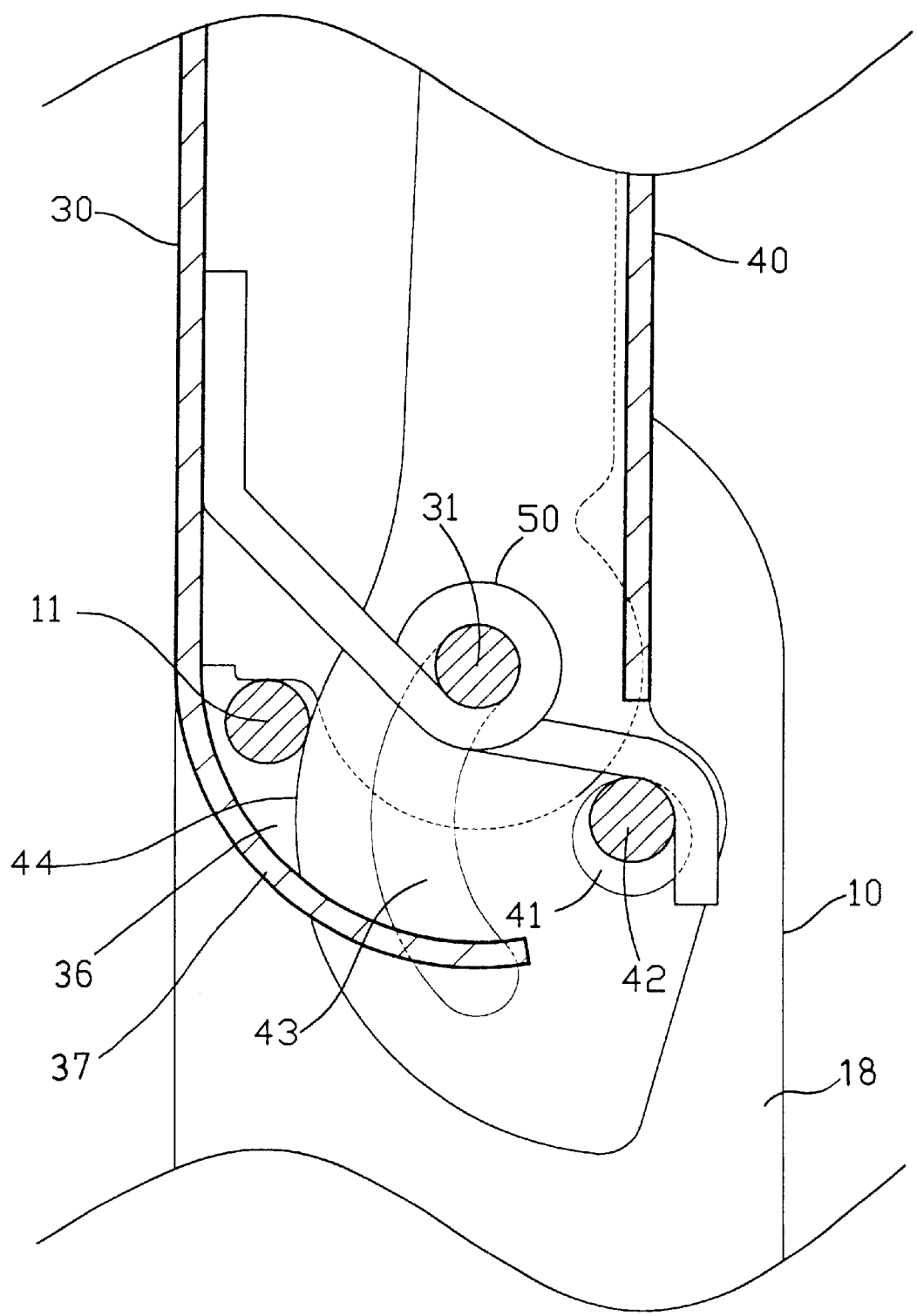
FIG. 5 s an enlarged partial cross sectional view of the support device.
Figure 10:
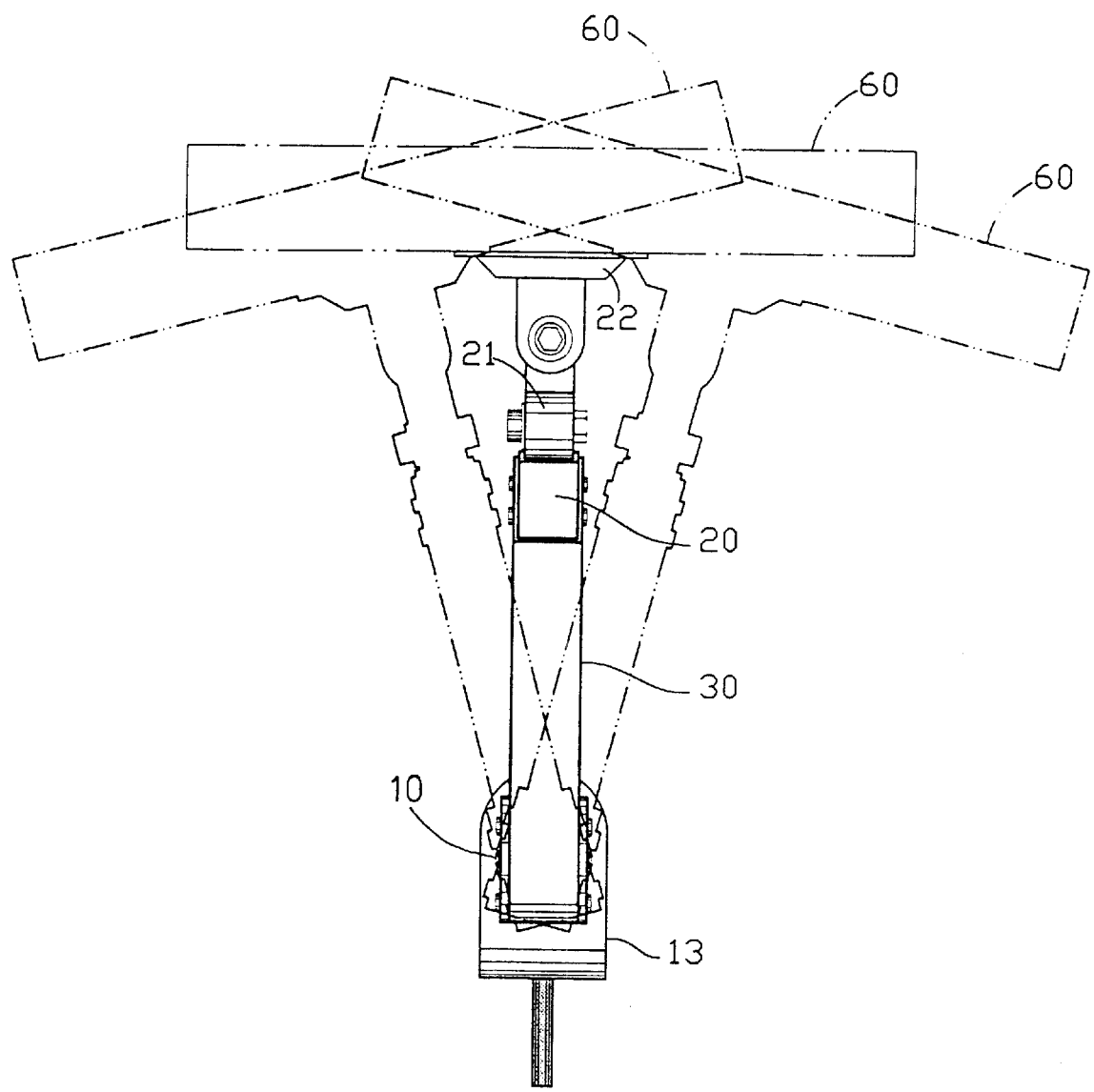

Referring to the drawings, and initially to FIGS. 3–5, a support device in accordance with the present invention comprises a base 10 including a U-shaped structure having a space 17 formed or defined between two walls 18, and including a lower portion pivotally or rotatably secured to a frame or a fastener or a clamp 13 or the like with a pivot spindle 12, for allowing the base 10 to be rotated relative to the clamp 13 to the required position (FIG. 10). The clamp 13 may be attached or secured to a support member, such as a table 99 (FIGS. 4, 6, 8) or the like. A stop 11 is secured in the base 10, such as secured between the upper portion of the walls 18 and located at the upper portion of the walls 18, and laterally extended through the space 17 of the base 10.

A frame or an arm 30 includes a lower portion received in the space 17 of the base 10 and pivotally or rotatably secured to the base 10 with a shaft 31, and includes an upper portion having an axle 32 secured therein, and having one or more curved channels 33 formed in the upper portion thereof and formed or provided around the axle 32, for allowing the axle 32 to be located at the center of curvature of the curved channels 33 of the arm 30. The arm 30 includes a curved passage 36 formed or provided in the bottom portion thereof and defined by a downwardly curved flap 37 and provided around the shaft 31, for allowing the shaft 31 to be located at the center of curvature of the curved passage 36 of the arm 30 The stop 11 is relatively and slidably received in the curved passage 36 of the arm 30 for limiting the rotational movement of the arm 30 relative to the base 10 and for allowing the arm 30 to be rotated relative to the base 10 between an upright position as shown in FIGS. 4 and 5 and a horizontal and downward position (not particularly shown).

A lever 40 includes an orifice 41 formed in the lower portion thereof for rotatably receiving a rod 42 and for pivotally or rotatably secured to the base 10 with the rod 42. The lever 40 includes a curved groove 43 formed in the lower portion thereof and formed or provided around the orifice 41 thereof and/or around the rod 42, for slidably receiving the shaft 31 and for allowing the lever 40 to be rotated relative to the base 10 about the rod 42. The lever 40 includes a curved or peripheral surface or flange 44 formed or provided around the orifice 41 thereof and preferably parallel to the curved groove 43 thereof for engaging with the stop 11 (FIGS. 4, 5) and for positioning or for securing the lever 40 and the arm 30 to the base 10, at the required angular position, which will be described in further details hereinafter. A spring 50 is engaged on the shaft 31 and engaged with the rod 42 of the base 10 and the arm 30 for biasing the arm 30 toward the upright position as shown in FIGS. 4 and 5.

A bracket 20 for supporting an object 60 thereon includes a lower portion pivotally or rotatably secured to the upper portion of the arm 30 with the axle 32. A post 34 is secured to the lower portion of the bracket 20 and is slidably engaged in the curved channels 33 of the arm 30 for guiding and for limiting the bracket 20 to rotate relative to the arm 30. The post 34 is secured to the upper end of the lever 40 and is slidably engaged in the curved channels 33 of the arm 30, such that the arm 30 and the lever 40 and the axle 32 and the post 34, and the shaft 31 and the rod 42 may form a parallelogrammic structure for allowing the arm 30 and the lever 40 to be rotated relative to each other and to be rotated relative to the base 10, and for adjusting the bracket 20 and thus the object 60 upward and downward to the selected position.

Figure 8:
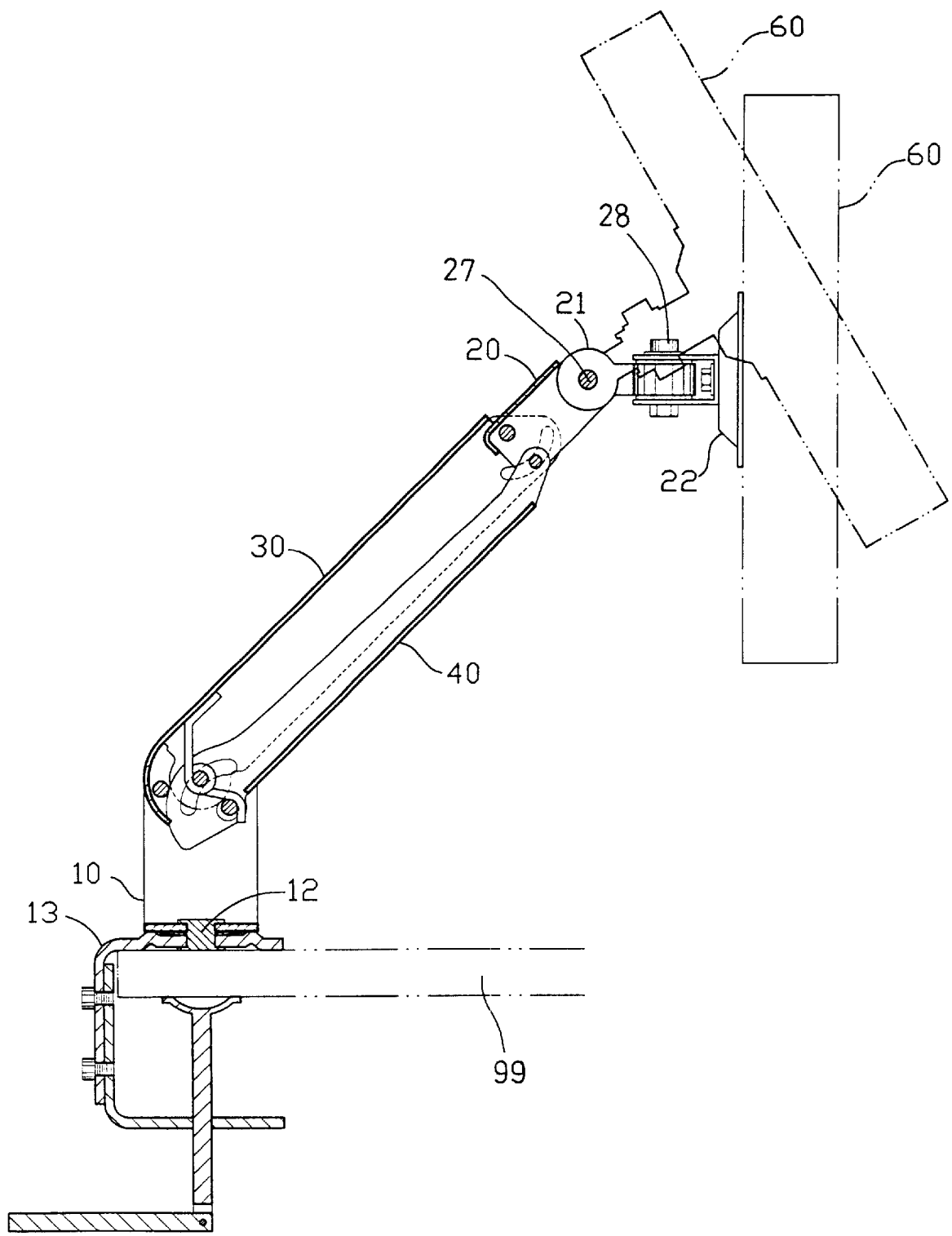
FIG. 8 is a cross sectional view similar to FIGS. 4 and 6, illustrating the operation of the support device.
Figure 9:
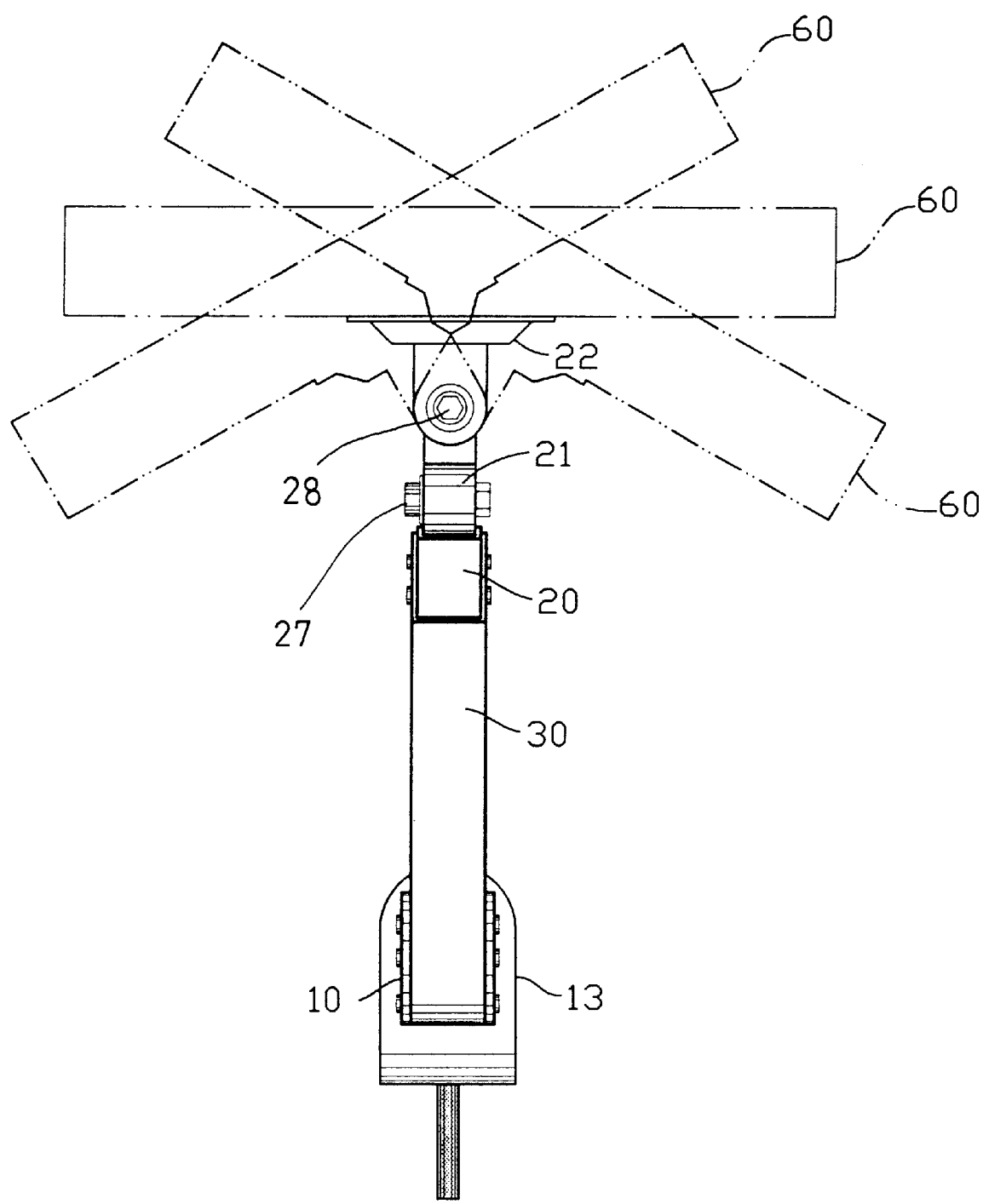
FIGS. 9 and 10 are top schematic views, illustrating the operation of the support device.

A coupler 21 includes one end pivotally or rotatably secured to the bracket 20 with a pivot pin or a fastener 27, for allowing the coupler 21 to be rotated or adjusted relative to the bracket 20 to any selected angular position, best shown in FIG. 8. The other end of the coupler 21 is pivotally or rotatably secured to another frame 22 with a pivot pin or a fastener 28 that is offset and perpendicular to the fastener 27, for allowing the frame 22 to be rotated or adjusted relative to the coupler 21 to any selected angular position, best shown in FIG. 9. The frame 22 may be secured to the object 60, such that the frame 22 and the object 60 may be adjusted relative to the coupler 21 and/or the bracket 20, and/or the arm 30, and/or the base 10, and/or the clamp 13 to any suitable and selected position.

It is to be noted that the arm 30 and the lever 40 form the two parallel sides of the parallelogrammic structure of the support device, and the lengths of the arm 30 and the lever 40 will not be changed, such that the distances between the axle 32 and the shaft 31, and between the post 34 and the rod 42 also will not be changed. The line formed or provided between the axle 32 and the post 34 will thus be always parallel to the line formed and provided between the shaft 31 and the rod 42. In addition, the shaft 31 and the rod 42 are fixed in the base 10 and will not be moved, such that the axle 32 and the post 34 and thus the bracket 20 will thus be always maintained at a direction parallel to the line between the shaft 31 and the rod 42, and such that the bracket 20 and the object 60 may be maintained at the predetermined direction relative to the base 10 when the arm 30 and the lever 40 are rotated and adjusted relative to the base 10.

Figure 6:
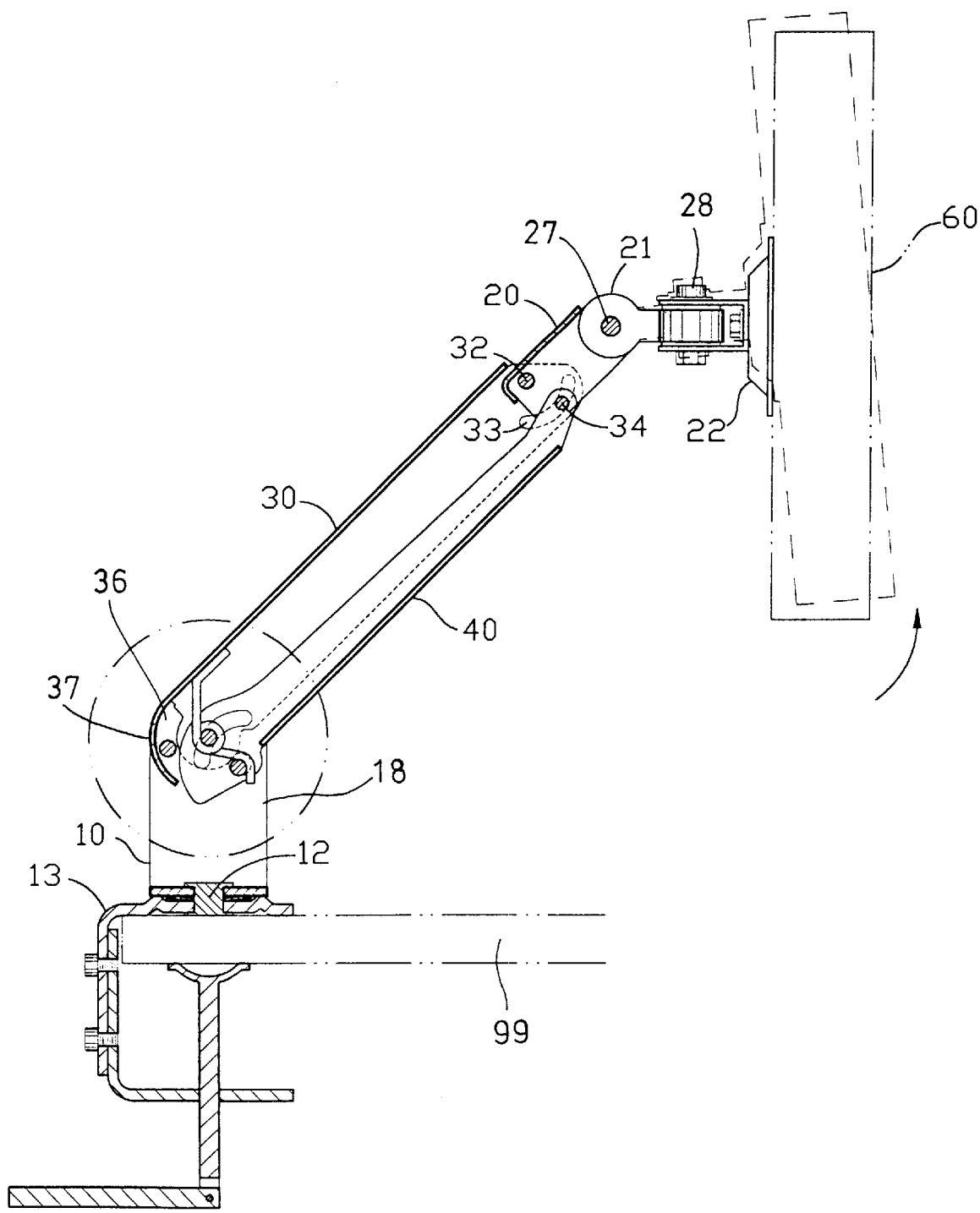
FIG. 6 is a cross sectional view similar to FIG. 4, illustrating the operation of the support device.
Figure 7:
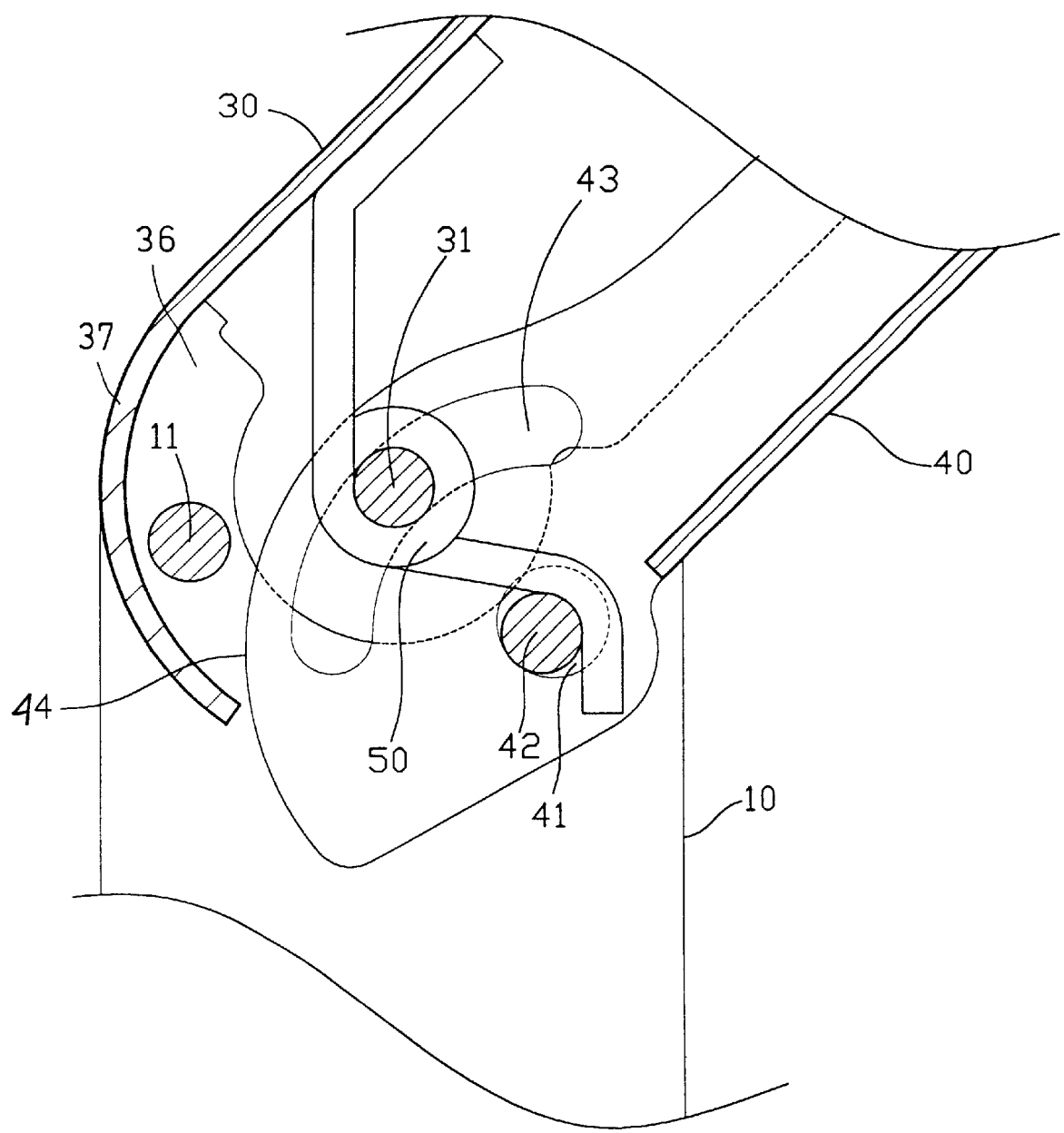
FIG. 7 is an enlarged partial cross sectional view similar to FIG. 5, illustrating the operation of the support device.

As best shown in FIGS. 4–7, and particularly in FIGS. 5 and 7, the orifice 41 of the lever 40 includes an inner diameter greater than the outer diameter of the rod 42, for allowing the lever 40 to be slightly moved and adjusted upward and downward relative to the shaft 31 and the rod 42 and the base 10 for a small distance, and for allowing the rod 42 to be moved or adjusted toward or away from the center of curvature of the peripheral flange 44 and the curved groove 43 of the lever 40. For example, as shown in FIGS. 6, 7, the lever 40 and/or the object 60 may be moved upward relative to the base 10 to move the rod 42 relatively downward to the bottom portion of the orifice 41 of the lever 40, for allowing the peripheral flange 44 of the lever 40 to be disengaged from the stop 11, and for allowing the arm 30 and the lever 40 to be rotated and adjusted relative to the base 10 to any suitable or selected angular position.

As shown in FIGS. 4, 5, when the lever 40 and the object 60 are released, the weight of the object 60 and/or of the lever 40 may move the lever 40 and the object 60 downward relative to the base 10, and thus may move the rod 42 relatively upward to the upper portion of the orifice 41 of the lever 40, for allowing the stop 11 to be engaged with the peripheral flange 44 of the lever 40 and to secure or retain the lever 40 and thus the arm 30 to the base 10 at the adjusted or selected angular position after the arm 30 and the lever 40 have been rotated and adjusted relative to the base 10 to the required or selected angular position.

Accordingly, when it is required to rotate and adjust the arm 30 and the lever 40 relative to the base 10, it is only required to elevate the lever 40 and/or the object 60 upward relative to the base 10 and to disengage the peripheral flange 44 of the lever 40 from the stop 11 (FIGS. 6, 7). The arm 30 and the lever 40 may then be easily and quickly secured to the base 10 at the required or selected angular position, by releasing the lever 40 and the object 60 and by engaging or latching the stop 11 with the peripheral flange 44 of the lever 40 (FIGS. 4, 5). No fasteners are required to be threaded or unthreaded relative to the base 10 to secure the arm 30 and the lever 40 to the base 10.

Accordingly, the support device in accordance with the present invention may be used for supporting the monitors, the displayers, the screens, or the other objects, and for easily and quickly adjusting the objects to the selected position without unthreading and threading fasteners.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A support device comprising:
   a base,
   a bracket for supporting an object,
   an arm including a lower portion pivotally secured to said base with a shaft, and including an upper portion pivotally secured to said bracket with an axle, and including a curved channel formed therein and formed around said axle,
   a lever including a lower portion pivotally secured to said base with a rod, and including a curved groove formed in said lower portion thereof and formed around said rod for slidably receiving said shaft and for allowing said lever to be rotated relative to said base, said lever including an upper portion pivotally secured to said bracket with a post, said post being slidably received in said curved channel of said arm for allowing said upper portion of said lever and said post to be rotated relative to said arm about said axle, and
   means for selectively latching said lower end of said lever to said base after said arm and said lever are rotated and adjusted relative to said base.

2. The support device according to claim 1, wherein said selectively latching means includes an orifice formed in said lower portion of said lever for receiving said rod, said orifice of said lever includes an inner diameter greater than an outer diameter of said rod for loosely receiving said rod therein, and for allowing said rod to be moved relative to said base by sliding said rod upward and downward relative to said orifice of said lever.

3. The support device according to claim 2, wherein said selectively latching means includes a stop secured to said base for engaging with said lower portion of said lever and for locking said lever to said base when said rod moves upward relative to said orifice of said lever, said lower portion of said lever is allowed to be disengaged from said stop when said lever is elevated relative to said base and to move said rod downward relative to said orifice of said lever.

4. The support device according to claim 3, wherein said lever includes a peripheral flange formed and provided in said lower portion thereof and provided around said rod for engaging with said stop.

5. The support device according to claim 1 further comprising means for biasing said arm to elevate said bracket.

6. The support device according to claim 1 further comprising means for limiting a rotational movement of said arm relative to said base.

7. The support device according to claim 6, wherein said limiting means includes a stop secured to said base, and a curved passage formed in said lower portion of said arm for slidably receiving said stop.

8. The support device according to claim 7, wherein said arm includes a downwardly curved flap provided on said lower portion thereof for forming and defining said curved passage thereof.

9. The support device according to claim 1 further comprising a coupler pivotally secured to said bracket with a first pin, and a frame pivotally secured to said coupler with a second pin, said first pin being offset and perpendicular to said second pin, for allowing said frame and the object to be rotated and adjusted relative to said bracket.

10. The support device according to claim 1 further comprising a clamp rotatably secured to said base with a pivot spindle, for allowing said base to be rotated relative to said clamp about said pivot spindle.

* * * * *